Nov. 10, 1970     M. J. DRABB     3,538,547
EXTRUDER HEAD FOR DUAL EXTRUSION
Filed April 26, 1968     2 Sheets-Sheet 1
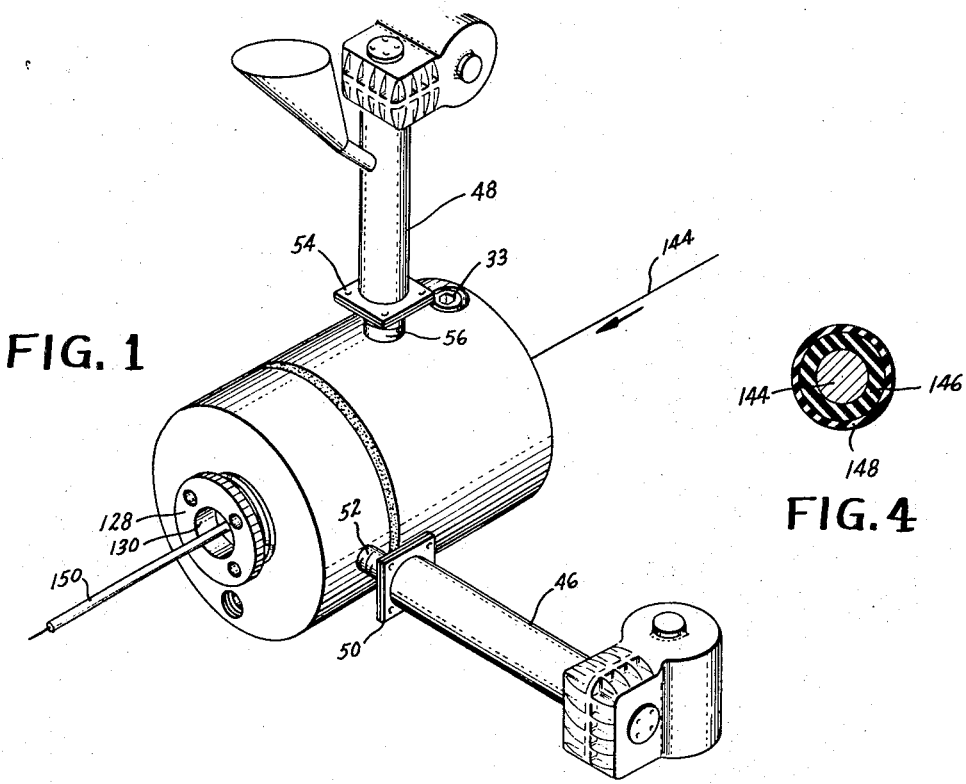
FIG. 1
FIG. 4
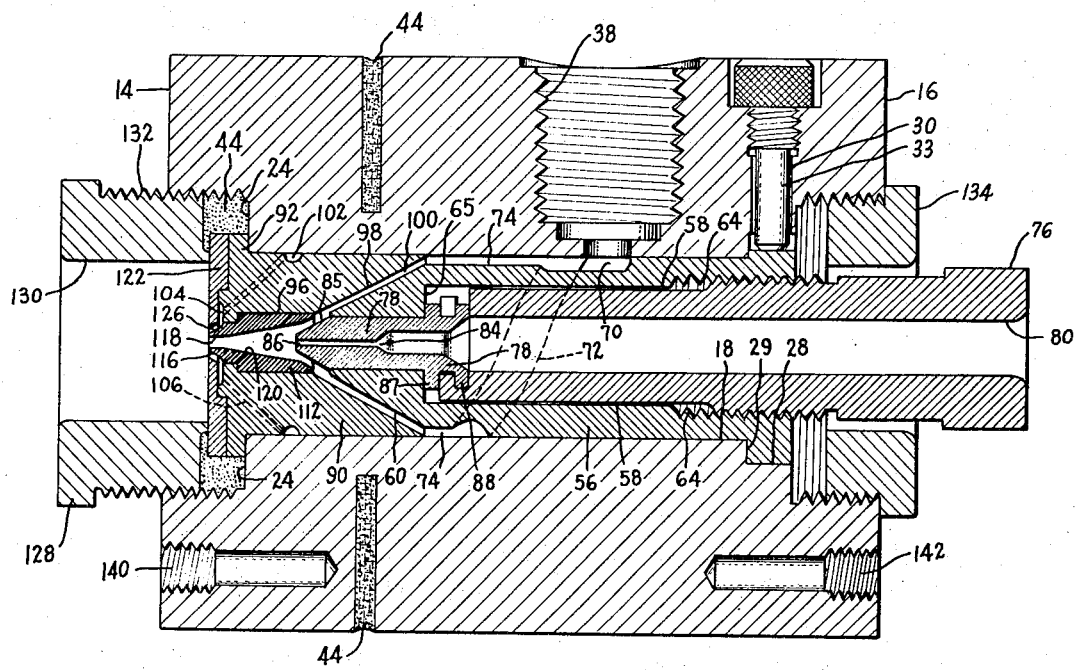
FIG. 2
INVENTOR.
MICHAEL J. DRABB
BY R. Jonathan Peters
ATTORNEY Nov. 10, 1970    M. J. DRABB    3,538,547
EXTRUDER HEAD FOR DUAL EXTRUSION
Filed April 26, 1968    2 Sheets-Sheet 2
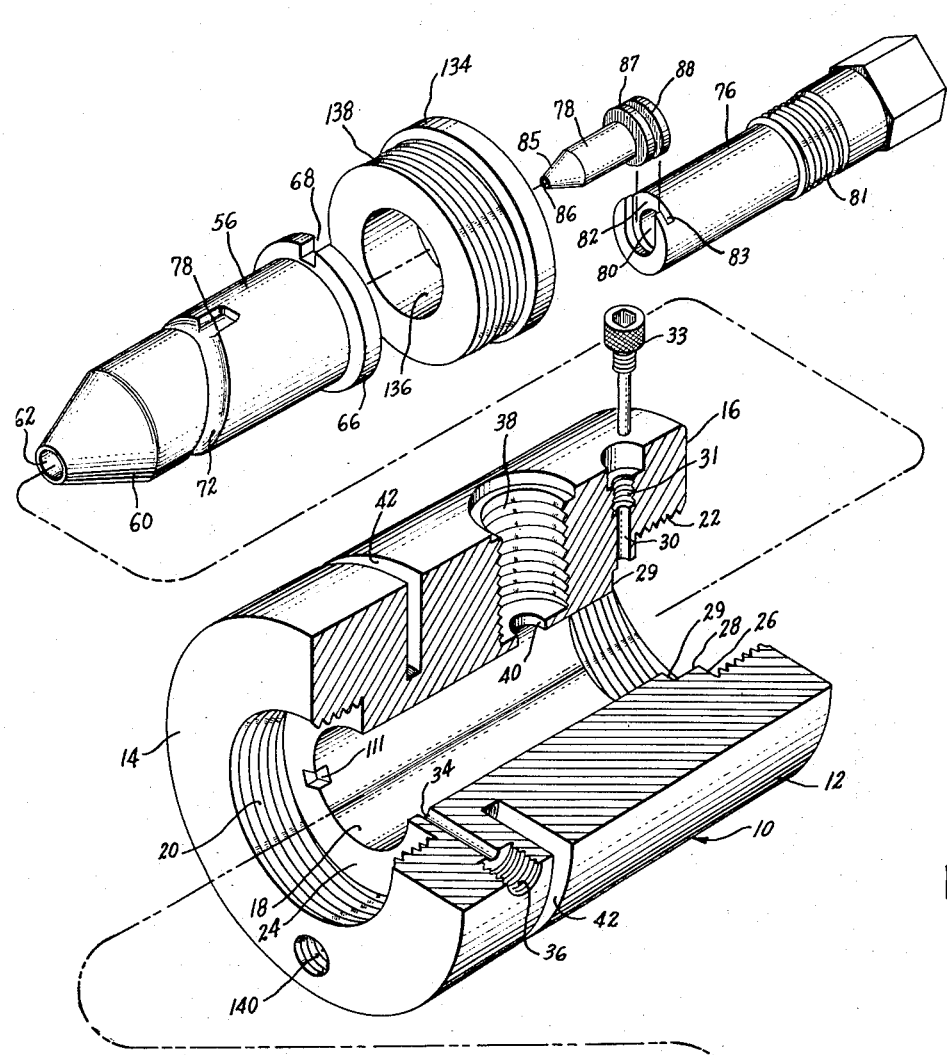
FIG. 3
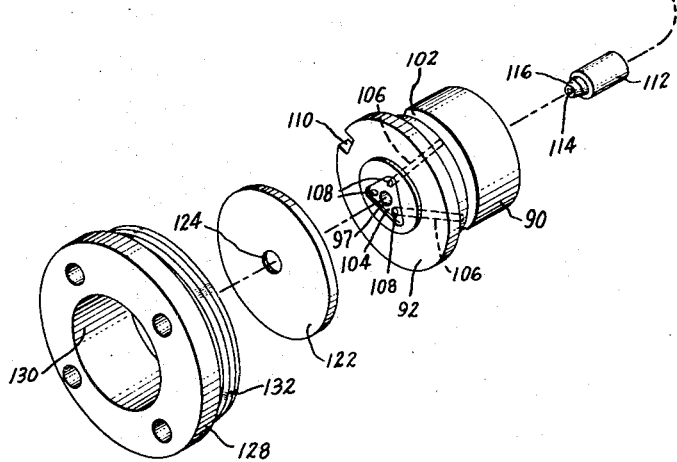
INVENTOR.
MICHAEL J. DRABB
BY R. Jonathan Peters
ATTORNEY United States Patent Office 3,538,547
Patented Nov. 10, 1970

3,538,547
EXTRUDER HEAD FOR DUAL EXTRUSION
Michael J. Drabb, Fairfield, Conn., assignor to General
Electric Company, a corporation of New York
Filed Apr. 26, 1968, Ser. No. 724,392
Int. Cl. B29f 3/12
U.S. Cl. 18—13
3 Claims

ABSTRACT OF THE DISCLOSURE

An apparatus or extruder is provided for the simultaneous extrusion of two layers of dissimilar plastic compositions having different melting points over a conductor. The extruder includes a main axial bore terminating with enlarged openings and two spaced passageways communicating with the main axial bore for feeding composition to the extruder. Wire guide assembly means cooperate with die assembly means substantially aligned in the main axial bore to define appropriate channels for feeding the composition over the conductor as separate layers.

This invention relates to an extruder head for the simultaneous extrusion of two layers of dissimilar plastic compositions having substantially different melting or softening points. In still a more specific aspect, this invention relates to an extruder head for the simultaneous extrusion of polyvinyl chloride and nylon over a metallic conductor.

The terms "melting point" or "softening point" are use herein and in the appended claims as synonymous terms, and refer to the temperature at which the composition is sufficiently plastic for extrusion.

In the manufacture of insulated wire, it is common practice to provide the metallic conductor with an insulating layer and a protective jacket. For example, small gauge wire such as electronic wire is typically provided with a plastic insulating layer such as polyethylene or polyvinyl chloride which is extruded directly over the metallic conductor. The insulating layer is provided with a protective jacket such as nylon which is relatively more tough. Extruding the insulation and jacket over the conductor may be done in tandem, but quite obviously it would be advantageous to eliminate the tandem operation. Where the melting points of the insulating and jacketing compositions are substantially the same, the materials may be applied simultaneously in a common extrusion head. For example, the melting points for extrusion conditions for polyethylene and for nylon are about 500° F., and because the melting point temperatures are compatible, it is possible to extrude both compositions simultaneously in a common extrusion head. However, where there is a substantial difference in melting points between the two compositions, such as with nylon (melting point 450–500° F.) and polyvinyl chloride (melting point 380–390° F., and burns at 410° F.), heretofore it has not been possible to provide for the dual extrusion of these compositions with a comon extruder head.

This invention has therefore as its object to provide an extruder head for the simultaneous extrusion of dissimilar plastic compositions having different melting points for extrusion conditions, and especially for the dual extrusion in a common extruder head of polyvinyl chloride and nylon.

The invention together with the objects and advantages thereof may be understood by referring to the following detailed description and to the accompanying drawings. In the drawings:

FIG. 1 is a perspective view of the extruder head of the present invention;
FIG. 2 is a cross-sectional view of the extruder head of FIG.1;
FIG. 3 is an exploded view of the die assembly; and
FIG. 4 is a cross-sectional view of an insulated wire showing two layers of plastic compositions extruded simultaneously by use of the apparatus of this invention.

Referring to the drawings wherein like numerals designate similar parts throughout, there is shown an extruder head, indicated generally by the numeral 10, of substantially cylindrical configuration and including sidewall 12 and opposed parallel marginal surfaces 14 and 16. The extruder head has a relatively large main axial bore 18 of substantially uniform diameter and enlarged internally threaded end openings 20 and 22 connected by the main bore 18 thereby providing inwardly disposed annular shoulders 24 and 26. Also, the inner periphery of shoulder 26 is provided with an annular reduced portion having lateral sidewall 28 and shoulder 29. Keyway 30, having a threaded socket portion 31 opens to the inside of bore 18 in lateral sidewall 28, and accommodates key 33. Passageway 34 in sidewall 12, having its axis substantially normal to the axis of main bore 18, communicates with main bore 18 adjacent shoulder 24 and rearwardly of opening 20 and opens at its outer end to threaded socket 36. Sidewall 12 is provided with a second larger threaded socket 38 spaced rearwardly from passageway 34 and desirably at right angles thereto, and aperture 40 in the bottom wall of socket 38 establishes communication with bore 18. Further, sidewall 12 is provided with a relatively deep exterior circumferential or annular recess 42 disposed between sockets 36 and 38 but relatively adjacent to socket 36 and passageway 34 and substantially parallel to said passageway. Recess 42 is packed with an insulation material 44 such as asbestos, fiber glass, or the like.

The plastic compound is fed to the extruder head 10 from compounding extruders 46 and 48. Extruder 46 is provided with flanged connector 50 having externally threaded stud 52 which engages socket 36, and similarly extruder 48 is provided with flanged connector 54 having externally threaded stud 56 for engagement with socket 38. In this manner, the hot plastic compound impelled under pressure by the extrusion screw or other suitable means is passed from extruder 46 through passageway 34 and from extruder 48 through aperture 40 to the die assembly, as explained hereinbelow in greater detail.

Concentrically arranged within bore 18 is cylindrical insulating bridge 56 having an axial bore 58, which is substantially co-axial with bore 18. The front or exit end of insulating bridge 56 is provided with a tapered exterior 60 which terminates with orifice 62 and the opposite end is internally threaded at 64. The axial bore 58 extending through the tapered section of the bridge is of reduced diameter and includes inwardly projecting annular shoulder 65. Collar 66 has keyway 68 which aligns with keyway 30 to accommodate the stem of key 33 thereby retaining the bridge in a stationary position within bore 18. Recess 70 in the exterior wall of bridge 56 is adapted to align with aperture 40, and annular groove 72 extends obliquely with respect to the longitudinal axis of the birdge from recess 70. The cylindrical portion of the insulating bridge extending from annular groove 72 to the tapered end is of reduced diameter thereby providing annular channel 74 between the bridge 56 and the wall of bore 18.

A guiding assembly through which the electrical conductor may be axially advanced includes a leader or nipple holder 76 and nipple 78, which are partially disposed within, and substantially coaxial with, the longitudinal axis of bore 58 of insulating bridge 56. The nipple holder 76 is provided with an axial bore 80 and an externally threaded section 81 for coupling with the internally threaded section 64 or bridge 56. Also, the front end of the nipple holder is provided with a substantially T-slot opening 82 and an annular grove 83 to supportedly engage the nipple as explained below.

Nipple 78 is provided with a central passageway 84 which includes an elongated section of reduced diameter sufficient to accommodate the electrical conductor advanced therethrough and which is substantially coaxial with bore 58, thereby serving primarily as the wire guide. The front or exit end of the nipple is provided with a tapered exterior surface 85 which terminates with orifice 86, and the opposite end is provided with spaced shoulders 87 and 88. The T-slot opening 82 and annular groove 83 are of sufficient size to accommodate shoulder 88, and shoulder 87 abuts the front marginal edge of the nipple holder, whereby the nipple is supportedly engaged by the nipple holder. On assembling the parts, the nipple and nipple holder are inserted into the axial bore 58 of insulating bridge 56 and the nipple holder threadedly engaged with the bridge until shoulder 87 of the nipple abuts the annular shoulder 65 of the bridge, thereby retaining the nipple in position. The tapered exterior surface 85 of the nipple 78 protrudes through the orifice 62 so as to be in substantial alignment with the tapered exterior surface 60 of the nipple holder 56 and central passageway 84 is in substantial axial alignment with bore 58, and the orifice 86 of the nipple is disposed between shoulder 24 and circumferential recess 42 of the extruder head.

Concentrically arranged in bore 18 is cylindrical jacketing bridge 90 having an annular flange 92 that abuts shoulder 24 of opening 20 of the extruder head. It will be observed that the diameter of opening 20 is substantially larger than the diameter of flange 92. The jacketing bridge is provided with a passageway bounded at the front or exit end by a cylindrical surface 96 terminating with centrally disposed orifice 97 and at the opposite end by a frusto-conical surface 98 diverging from the cylindrical surface which cooperates with the tapered exterior surfaces 60 and 85 to define a tapered gap or passageway 100. Jacketing bridge 90 is provided with an exterior annular recess 102 which is in substantial alignment with channel 34 for establishing communication with the compounding extruder 56. The central area of the face of flange 92 is recessed at 104 around the centrally disposed opening 97. One or more channels 106 extends from the annular recess 102 to orifices 108 which surround the centrally disposed opening 97 and open at the recess 104. In addition, flange 92 is provided with a keyway 110 which is aligned with recess or keyway 111 for accommodating a suitable key (not shown) thereby retaining the jacketing bridge in position.

Intermediate or insulating die 112 is disposed concentrically within the cylindrical bore 96 of the jacketing bridge 90, and has a die orifice 114 which is substantially coaxial with passageway 84 of nipple 78 and bore 80 of nipple holder 76. The insulating die is provided with a tapered exterior 116 at the exit and which protrudes beyond the central opening 97 of the jacketing bridge. The bore of the intermediate die is bounded by cylindrical surface 118 at its exit and a frusto-conical surface 120 at the opposite end or entrance and diverging toward the entrance. The base of the frusto-conical surface 120 is of sufficient diameter to accommodate at least a portion of the tapered exterior 85 of nipple 78. In this manner, the tapered exterior surfaces of the insulating bridge and nipple cooperate with the tapered interior surfaces of the jacketing bridge and intermediate die to define tapered gap or passageway 100 which is in communication with channel 74 and groove 72.

Jacketing die plate 122 of substantially disc shape is provided with a centrally disposed tapered die orifice 124 which is in alignment with the central orifice 114 of intermediate die 112 and is of sufficient diameter to accommodate the tapered exterior 116 of the intermediate die. Die plate 122 is of substantially the same diameter as flange 92 of jacketing bridge 90 but of substantially smaller diameter than the diameter of opening 20 of the extruder head whereby the flange and die plate are spaced from the wall of the opening 20, and the back surface of the die plate mates with the face of the flange. In this manner, the tapered exterior 116 of the intermediate die cooperates with the tapered orifice of the die plate to define a tapered passageway 126 which is in communication with recess 104, channels 106, and recess 102.

A locking nut or tightening ring 128 having a large central opening 130 is threaded at 132 for coupling with threaded opening 20 of the extruder head 10. Upon threaded engagement, the locking nut abuts the front face of the die plate 122. However, that portion of the opening 20 surrounding the flange and die plate 122 is packed with an insulating material such as asbestos, fiberglass, or the like, the locking nut is then coupled with opening 20.

The opposite end of the extruder head is provided with a second locking nut or tightening ring 134 having a large central opening 136 of sufficient diameter to accommodate nipple holder 76. The locking nut is threaded at 138 for coupling with the threaded opening 22 of the extruder head. Also, the extruder head is provided with recess 140 adjacent the jacketing bridge 90 to accommodate a thermocouple (not shown) for measuring the temperature of the jacketing composition, and with a second recess 142 adjacent the region where the insulating composition enters the extruder head to accommodate a thermocouple (not shown) to measure the temperature of the insulating composition.

It will be observed that the apparatus of my invention may be assembled with relative ease, and that the parts may be removed from the extruder head for repairs or displacement without the need for disassembling the complete apparatus. Thus, in assembling the apparatus, intermediate die 112 is inserted into the cylindrical bore 96 of jacketing bridge 90, and these parts are inserted through opening 20 into bore 18 such that the flange 92 abuts shoulder 24. The jacketing die plate 122 is then inserted through opening 20 to mate with flange 92 such that orifices 124 and 97 are in substantial alignment. The opening surrounding the die plate 122 and flange 92 is packed with an insulating material 44 (e.g., asbestos), and locking nut 128 is screw-threaded into opening 20. Insulating bridge 56 is inserted from the opposite end of the extruder head through opening 22 until collar 66 abuts shoulder 29, and is retained in place by key 33. Nipple 78 is supportedly engaged by holder 76 and inserted through opening 22 into bore 58 of the bridge 56 and the holder is screw-threaded with the internal threads 64 of the bridge until shoulder 87 abuts annular shoulder 65. Locking nuts 134 is threadedly engaged into opening 22, and the shank of nipple holder 76 protrudes through the opening 136 whereby the nipple and nipple holder may be removed from the extruder head without the need for disengaging any additional parts.

The operation of the apparatus of this invention in the simultaneous extrusion of a polyvinyl chloride insulating layer and nylon jacket over an electrical conductor is as follows. The electrical conductor 144 is passed through the axial bore 80 and the central passageway 84 of the nipple which serves as the wire guide. Polyvinyl chloride 146 which has been heated to a temperature of about 380–390° F. is impelled from extruder 48 through aperture 40 and passed into recess 70, groove 72, annular channel 74, and passageway 100. The polyvinyl chloride is extruded over the conductor as it exits from orifice 86, and is then passed through die orifice 118. Nylon 148 which has been heated to a temperature of about 460–500° F. is impelled from extruder 56 through passageway 34 into annular recess 102, channels 106, recess 104, and passageway 126. As the conductor bearing the insulation layer exits at orifice 114, the nylon layer is extruded over the insulation layer. The insulated and jacketed wire 150 leaves the extruder head through opening 130 of the locking nut 128.

As a result of my invention, additional equipment normally required for a dual extrusion operation is eliminated. Another significant advantage is that re-reeling is eliminated, and further any intermediate tests normally conducted on the insulating layer are also eliminated, thereby reducing the manufacturing cycle and risk in damage resulting from extra handling. Still further, the nylon is extruded directly over hot polyvinyl chloride whereby a better bond is obtained between the two layers. Also, in a tandem operation required by the prior art, the first layer is exposed during reeling and other handling operations, and consequently may become contaminated; whereas my invention eliminates any such likelihood.

I claim:

1. Apparatus for the simultaneous extrusion of two layers of dissimilar plastic compositions having substantially different melting points over a conductor, which comprises an extruder head having enlarged first and second end openings connected by a main axial bore of substantially uniform diameter smaller than the diameter of said end openings to provide inwardly disposed annular shoulders at the base of said openings; a first passageway in said extruder head substantially transverse to said main axial bore and communicating therewith and disposed relatively adjacent said first opening for admitting a plastic composition which comprises the outer layer; a second passageway in said extruder head substantially transverse to said main axial bore and communicating therewith spaced from said first pasageway towards said second opening for admitting a plastic composition which comprises the inner layer; an exterior circumferential recess in said extruder head between said first and second passageways and relatively adjacent said first passageway; guide means disposed in said main axial bore and having an axial passageway therethrough for guiding the conductor through said extruder head; a die insert at least partially disposed within said main axial bore and having a flanged section exteriorally disposed of said main axial bore in said first end opening and abutting the annular shoulder of said first opening, the marginal edge of said flanged section spaced from the wall of said first opening; said die insert having a substantially longitudinal passageway terminating with an orifice in said flanged section in substantially axially alignment with said axial passageway of said guide means; said die insert and said guide means defining a channel in communication with said second passageway for distribution of hot plastic composition comprising the inner layer over the conductor; said die insert having at least one channel co-terminating with said die orifice in said flanged section and in communication with said first passageway for distribution of hot plastic composition comprising the outer layer over the conductor; and means engageable with said first and second openings for retaining assembly of said guide means and said die insert in said extruder head; the improvement comprising insulation material packed into said exterior circumferential recess, and insulation material packed into said first opening around the marginal edge of said flanged section.

2. Apparatus according to claim 1 wherein said insulation material comprises asbestos.

3. An apparatus according to claim 1 wherein the improvement further comprises said guide means including a bridge member concentrically arranged within said main axial bore extending forwardly from said second opening and provided with an open-ended axial bore having an internally threaded section; a nipple holder, having an axial bore, disposed partially within the bore of said bridge and having an externally threaded section for engagement with the internally threaded section of said bridge, said nipple holder extending rearwardly of and outwardly from said main axial bore and said second opening; and a nipple detachably engaged by said nipple holder for disposition within the bore of said bridge and protruding forwardly of the opening thereof, said nipple having an axial passageway substantially coaxial with the bore of said nipple holder and in substantial axial alignment with said orifice of said die insert.

References Cited
UNITED STATES PATENTS

| | | | |
|---|---|---|---|
| 2,185,701 | 1/1940 | Boyle | 18—13 |
| 2,501,690 | 3/1950 | Pendergast | 18—13 XR |
| 2,560,778 | 7/1951 | Richardson et al. | 18—13 |
| 3,023,461 | 3/1962 | Sherman | 18—13 XR |
| 3,206,802 | 9/1965 | Van Riper. | |
| 3,239,884 | 3/1966 | Seidle et al. | 18—13 |
| 3,241,503 | 3/1966 | Schafer | 18—13 XR |

WILBUR L. McRAY, Primary Examiner